US012675071B2

(12) United States Patent
Kubota

(10) Patent No.: US 12,675,071 B2
(45) Date of Patent: Jul. 7, 2026

(54) IMAGE FORMING APPARATUS WITH A STOPPER MEMBER AND AN URGING MEMBER

(71) Applicant: CANON KABUSHIKI KAISHA, Tokyo (JP)

(72) Inventor: Hitoshi Kubota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/057,718

(22) Filed: Feb. 19, 2025

(65) Prior Publication Data

US 2025/0271811 A1 Aug. 28, 2025

(30) Foreign Application Priority Data

Feb. 22, 2024 (JP) ................................ 2024-025974

(51) Int. Cl.

| | |
|---|---|
| ***G03G 21/18*** | (2006.01) |
| ***G03G 15/00*** | (2006.01) |
| ***G03G 15/01*** | (2006.01) |
| ***G03G 15/08*** | (2006.01) |
| ***G03G 21/16*** | (2006.01) |

(52) U.S. Cl.

CPC ..... *G03G 21/1821* (2013.01); *G03G 15/0121* (2013.01); *G03G 15/0813* (2013.01); *G03G 15/0896* (2013.01); *G03G 15/75* (2013.01); *G03G 21/1633* (2013.01); *G03G 21/1647* (2013.01); *G03G 21/1671* (2013.01); *G03G 21/1676* (2013.01); *G03G 21/1814* (2013.01);

(Continued)

(58) Field of Classification Search

CPC ........... G03G 15/0121; G03G 15/0813; G03G 15/0896; G03G 15/75; G03G 21/1633; G03G 21/1647; G03G 21/1671; G03G 21/1676; G03G 21/1814; G03G 21/1821; G03G 21/1835; G03G 21/185; G03G 21/1853

See application file for complete search history.

(56) References Cited

U.S. PATENT DOCUMENTS

2007/0160388 A1* 7/2007 Yoshimura ......... G03G 21/1647 399/111

2010/0316409 A1* 12/2010 Ji ....................... G03G 21/1821 399/111

(Continued)

*Primary Examiner* — Joseph S Wong

(74) *Attorney, Agent, or Firm* — Canon U.S.A., Inc. IP Division

(57) ABSTRACT

An image forming apparatus includes an apparatus body, a photosensitive member unit, a developing unit, a pressing member movable between a first position for pressing the developing unit and a second position for releasing pressure, a stopper member movable between a regulating position for preventing the pressing member from moving from the second position to the first position and a retracting position for permitting the pressing member to move from the second position to the first position, and an urging member configured to urge the stopper member, wherein, in a case where the developing unit and the photosensitive member unit are attached to the apparatus body, the stopper member is at the retracting position, and wherein, in a case where the developing unit is attached to the apparatus body and the photosensitive member unit is not attached to the apparatus body, the stopper member is at the regulating position.

5 Claims, 13 Drawing Sheets

(52) U.S. Cl.
CPC ....... *G03G 21/1835* (2013.01); *G03G 21/185* (2013.01); *G03G 21/1853* (2013.01)

(56) References Cited

U.S. PATENT DOCUMENTS

| | | | | |
|---|---|---|---|---|
| 2015/0370220 | A1* | 12/2015 | Hashimoto ........ | G03G 21/1853 399/119 |
| 2016/0209804 | A1 | 7/2016 | Katsumata | |
| 2017/0285571 | A1 | 10/2017 | Takahashi | |

* cited by examiner

IMAGE FORMING APPARATUS WITH A STOPPER MEMBER AND AN URGING MEMBER

BACKGROUND

Field

The present disclosure relates to copiers, printers, facsimiles, and other image forming apparatuses having developing units attachable to and detachable from the image forming apparatuses independently of photosensitive member units.

Description of the Related Art

U.S. Publication No. 20170285571 discusses an image forming apparatus including a photosensitive member unit having a photosensitive member, and a developing unit having a developer carrier for bearing and carrying a developer to develop an electrostatic latent image formed on the photosensitive member. The developing unit is attachable to and detachable from an apparatus body independently of the photosensitive member unit. The image forming apparatus has doors for accessing the photosensitive member unit and the developing unit. When a user or service person opens a door, application of the pressure to the developing unit is released, allowing the photosensitive member unit and the developing unit to be attached, detached, or replaced.

U.S. Publication No. 20160209804 discusses an image forming apparatus in which, in a state where a photosensitive member unit and a developing unit are attached to an apparatus body, the photosensitive member unit is positioned relative to the apparatus body, and the developing unit is positioned relative to the photosensitive member unit. More specifically, in a state where the photosensitive member unit and the developing unit are attached to the apparatus body, the developing unit is positioned relative to the photosensitive member unit when bearings at both longitudinal ends of the developer carrier come into contact with bearings at both longitudinal ends of the photosensitive member.

The image forming apparatus discussed in U.S. Publication No. 20160209804 has a configuration in which the photosensitive member unit serves as a reference for positioning the developing unit. A case in this configuration, where the door can be closed even in a state where the developing unit is attached to the apparatus body and the photosensitive member unit is not attached to the apparatus body, will be considered below. In this case, if the door is closed in a state where the photosensitive member unit is not attached to the apparatus body, the developing unit is pressed. Accordingly, the developing unit not having been positioned takes an unexpected orientation and may possibly collide with other units in the apparatus body by the vibration, for example, during transportation of the image forming apparatus.

SUMMARY

The present disclosure is directed to ensuring the orientation of a developing unit positioned relative to a photosensitive member unit attached to the apparatus body, in a case where the developing unit is attached to the apparatus body and the photosensitive member unit is not attached to the apparatus body.

According to some embodiments, an image forming apparatus includes an apparatus body, a photosensitive member unit including a photosensitive member on which an electrostatic latent image is formed, and configured to be attachable to and detachable from the apparatus body and positioned relative to the apparatus body, a developing unit including a developer carrier for bearing and carrying a developer for developing the electrostatic latent image formed on the photosensitive member, and configured to be attachable to and detachable from the apparatus body and positioned relative to the photosensitive member unit attached to the apparatus body, a pressure member configured to be movable between a first position for pressing the developing unit toward the photosensitive member unit and a second position for releasing application of pressure to the developing unit, a stopper member configured to be movable between a regulating position for preventing the pressing member from moving from the second position to the first position and a retracting position for permitting the pressing member to move from the second position to the first position, the retracting position being retracted from the regulating position, and an urging member configured to urge the stopper member, wherein, in a case where the developing unit is attached to the apparatus body and the photosensitive member unit is also attached to the apparatus body, the stopper member urged by the urging member is at the retracting position, and wherein, in a case where the developing unit is attached to the apparatus body and the photosensitive member unit is not attached to the apparatus body, the stopper member urged by the urging member is at the regulating position.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the accompanying drawings. The following exemplary embodiments do not limit the present disclosure within the scope of the appended claims. Not all of the combinations of the features described in a first exemplary embodiment are indispensable to the solutions for the present disclosure. The present disclosure can be embodied for printers, various printing apparatuses, copiers, facsimiles, multifunction peripherals, and other diverse applications.

Configuration of Image Forming Apparatus

A configuration of an image forming apparatus according to a first exemplary embodiment will be described below with reference to the schematic view in FIG. 1.

Figure 1:
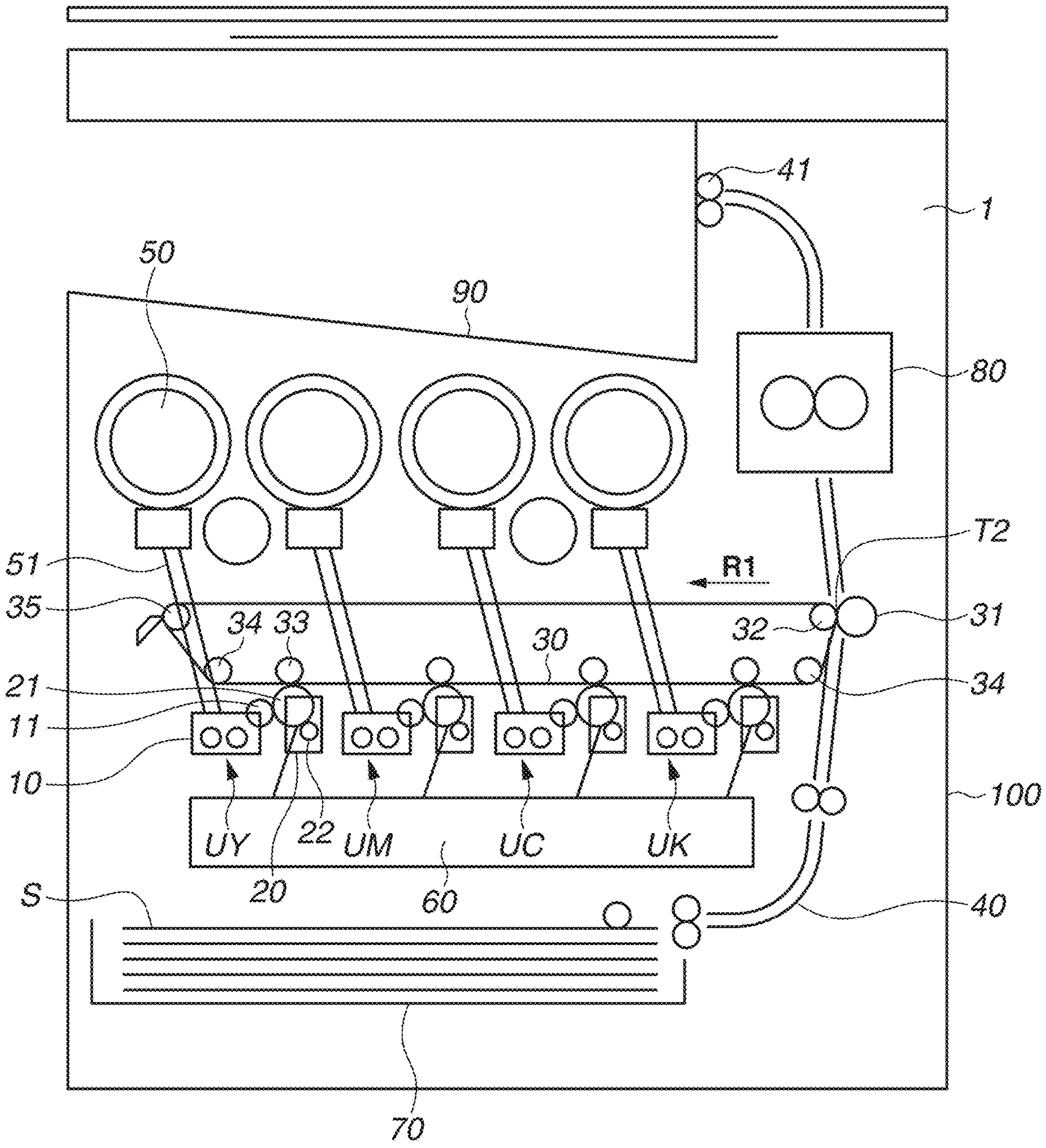
FIG. 1 is a schematic view illustrating a configuration of an image forming apparatus according to a first exemplary embodiment.

As illustrated in FIG. 1, an image forming apparatus 1 is what is called an intermediate transfer tandem apparatus having an apparatus body 100 including image forming units UY, UM, UC, and UK for four different colors disposed to face an intermediate transfer belt 30. More specifically, the image forming apparatus 1 includes four different image forming units UY, UM, UC, and UK for yellow (Y), magenta (M), cyan (C), and black (K), respectively. However, the number of colors is not limited to four, and the order of the colors is not limited to this order.

Each of the image forming units UY, UM, UC, and UK includes a developing unit 10 and a photosensitive member unit 20. The image forming unit UY (UM to UK) includes a combination of the developing unit 10 and the photosensitive member unit 20 each of which is independently formed.

A recording material conveyance process of the image forming apparatus 1 will be described below. A recording material S is stacked and stored in a recording material storage (cassette) 70 and is fed to a conveyance path 40 in synchronization with an image forming timing. The recording material S fed from the recording material storage (cassette) 70 is subjected to skew correction and timing correction and then sent to a secondary transfer portion T2. The secondary transfer portion T2 is a nip portion formed by a secondary outer transfer roller 31 and a secondary inner transfer roller 32 facing each other. When a predetermined pressure and a predetermined electrostatic load bias are applied, a toner image is absorbed on the recording material S.

A process for conveying the recording material S to the secondary transfer portion T2 has been described above. A process for forming an image conveyed to the secondary transfer portion T2 at a similar timing will be described below. The image forming units UY to UK will be described below. Since the configurations of the image forming units UY to UK are basically the same except for the toner color, the image forming unit UY for yellow will be described below on behalf of the units UY to UK.

The image forming unit UY mainly includes the developing unit 10 having a developing sleeve 11 as a developer carrier for bearing and carrying a developer to develop an electrostatic latent image formed on a photosensitive drum 21, and the photosensitive member unit 20 having the photosensitive drum 21 and a charge roller 22. The developing unit 10 and the photosensitive member unit 20 will be described below.

The surface of the photosensitive drum 21 rotatably driven is uniformly pre-charged by the charge roller 22, and then an electrostatic latent image is formed by an exposure unit 60 driven based on an image information signal. The electrostatic latent image formed on the photosensitive drum 21 is developed with toner by the developing sleeve 11 to be a visible image.

When applied with a predetermined pressure and a predetermined electrostatic load bias by a primary transfer unit 33 disposed to face the image forming unit UY across the intermediate transfer belt 30, the toner image formed on the photosensitive drum 21 is primarily transferred onto the intermediate transfer belt 30. A toner supply unit (not illustrated) supplies a two-component developer (a mixture of a toner and a magnetic carrier) from a toner bottle 50 set in the image forming unit UY to the developing unit 10 through a supply path 51.

The intermediate transfer belt 30, an endless belt stretched by various rollers such as the secondary inner transfer roller 32, a driven roller 34, and a tension roller 35, is rotatably driven in the direction of the arrow R1 in FIG. 1. The secondary inner transfer roller 32 also serves as a drive roller for driving the intermediate transfer belt 30. The above-described image forming process is performed for four different colors in parallel by the image forming units UY to UK. This process for each color is performed at such a timing that the toner image is transferred on top of the toner image of another color coming from the upstream which has been primarily transferred on the intermediate transfer belt 30. As a result, a full-color toner image is eventually formed on the intermediate transfer belt 30 and then conveyed to the secondary transfer portion T2.

With the above-described conveyance process and image forming process, secondary transfer is performed with matched timing of the recording material S and the full-color toner image at the secondary transfer portion T2. Then, the recording material S is conveyed to the fixing unit 80, and the toner image is melted and fixed to the recording material S with a predetermined pressure and a predetermined amount of heat. The recording material S with an image fixed thereon is discharged onto a discharge tray 90 by a discharge roller 41.

Generally, durability lives of the developing unit 10 and the photosensitive member unit 20 are shorter than the durability life of other image forming process units (e.g., the fixing unit 80) included in the image forming apparatus 1. For this reason, the developing unit 10 and the photosensitive member unit 20 may need to be replaced. Accordingly, the apparatus body 100 is provided with insertion slots (not illustrated) for attaching and detaching the developing units 10 and the photosensitive member units 20 for the image forming units UY to UK on the front face (the near side in the insertion direction or the near side in FIG. 1). An openable and closable door (not illustrated) is provided to cover the insertion slot for each color or cover the insertion slots for all colors.

Each of the developing units 10 and the photosensitive member units 20 is independently attached to the apparatus body 100 in consideration of a different durability life setting and the easiness of replacement during downtime.

The insertion direction (longitudinal direction) of the developing unit 10 and the photosensitive member unit 20 is the same as the rotational axis direction of the developing sleeve 11 and the rotational axis direction of the photosensitive drum 21. The developing unit 10 and the photosensitive member unit 20 operate while receiving a transmitted drive force and supplied with electric power from the apparatus body 100. To allow the drive force transmission and the electric power supply between the apparatus body 100 and the developing unit 10 and between the apparatus body 100 and the photosensitive member unit 20, the developing unit 10 and the photosensitive member unit 20 are attached to the apparatus body 100 via coupling members (not illustrated).

(Configuration of Developing Unit)

The configuration of the developing unit 10 according to the first exemplary embodiment will be described below with reference to the schematic view in FIG. 2 and the cross-sectional view in FIG. 3.

Figure 2:
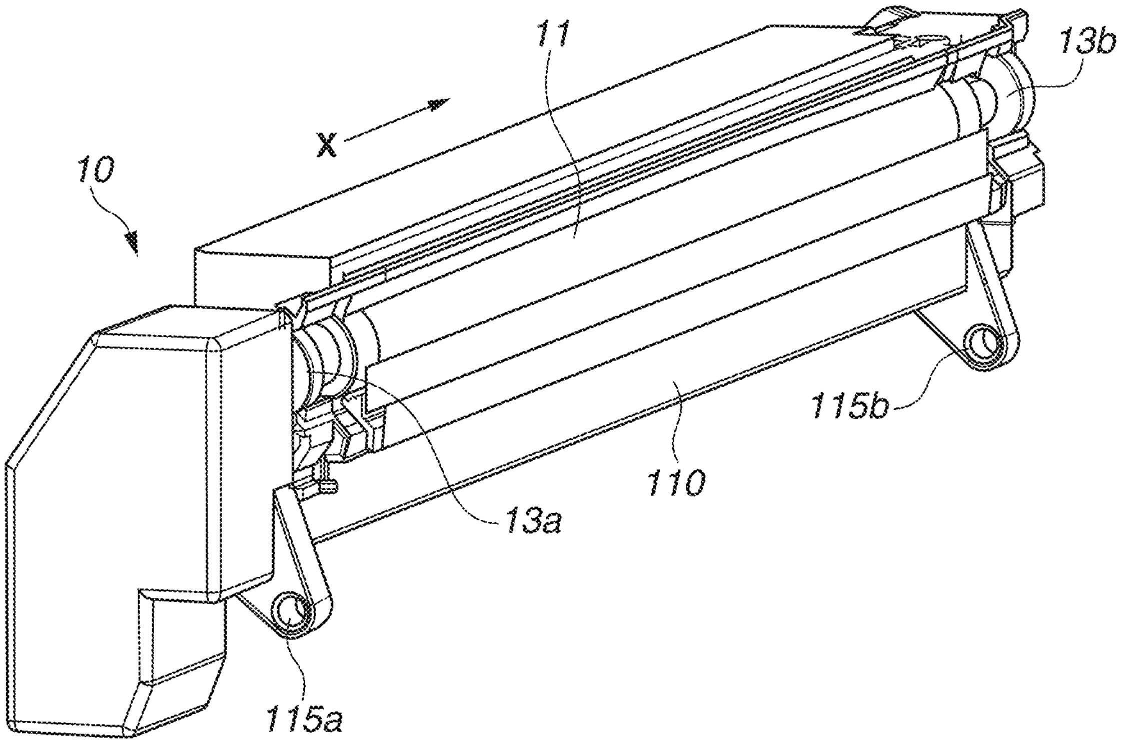
FIG. 2 is a schematic view illustrating a configuration of a developing unit according to the first exemplary embodiment.
Figure 3:
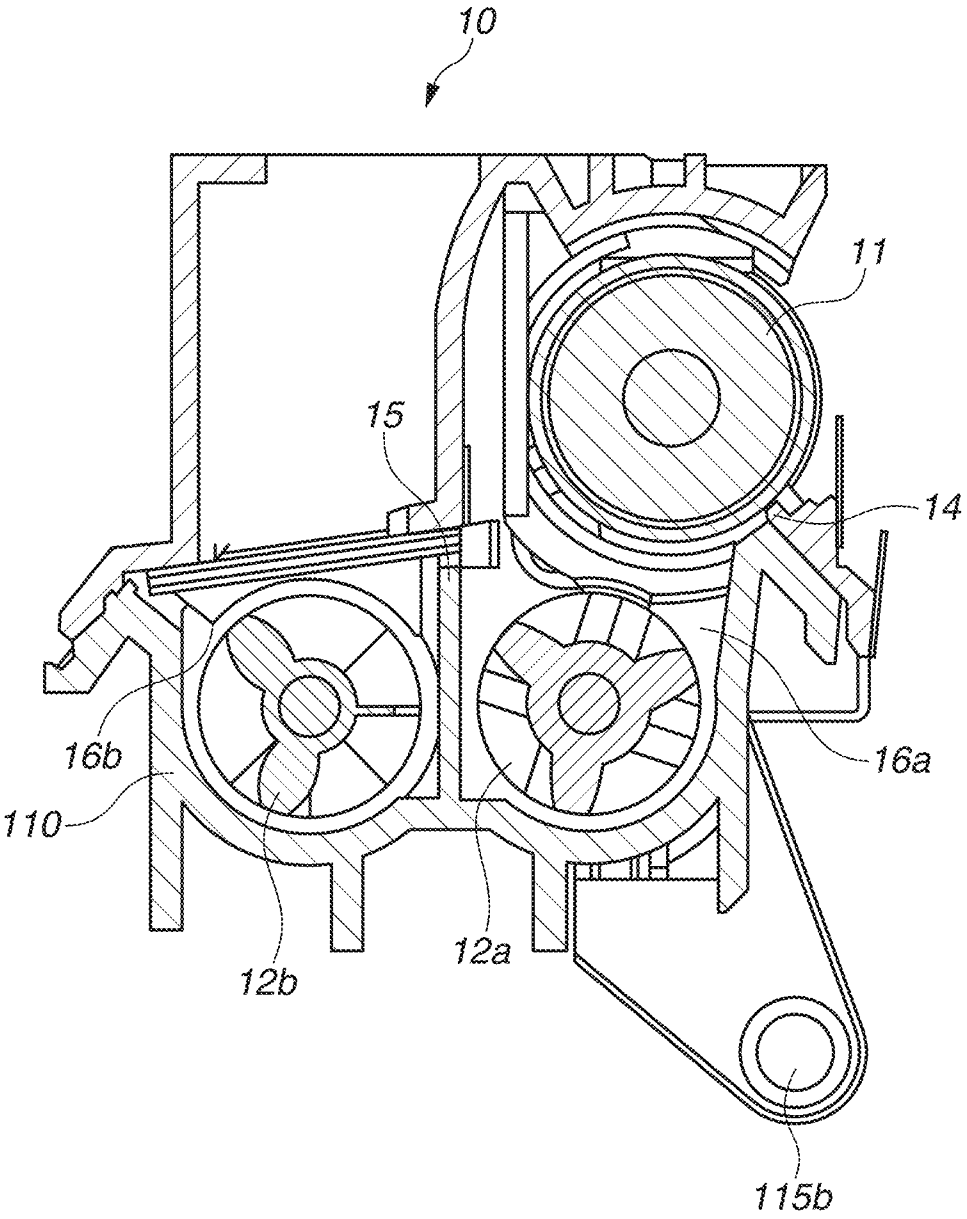
FIG. 3 is a cross-sectional view illustrating a configuration of the developing unit according to the first exemplary embodiment.

As illustrated in FIG. 2, the developing unit 10 includes a developing container 110 and the developing sleeve 11. In the developing container 110, the developing sleeve 11 is rotatably supported by bearings 13*a* and 13*b* disposed at both ends on the near and the far sides in the insertion direction (the direction of the arrow X in FIG. 2). As discussed below, the bearings 13*a* and 13*b* also have a function of members for forming a gap between the developing sleeve 11 and the photosensitive drum 21. The developing unit 10 is swingably supported with respect to the apparatus body 100 via fitting holes 115*a* and 115*b*.

The developing container 110 stores a two-component developer (hereinafter simply referred to as a developer) containing a nonmagnetic toner and a magnetic carrier. The inside of the developing container 110 is partitioned into two chambers (a developing chamber 16*a* and a stirring chamber 16*b*) by a partition wall 15, as illustrated in FIG. 3. The developing chamber 16*a* and the stirring chamber 16*b* are connected at both longitudinal ends of the developing container 110.

A conveyance screw 12*a* is rotatably supported in the developing chamber 16*a*, and a stirring screw 12*b* is rotatably supported in the stirring chamber 16*b*. The conveyance screw 12*a* and the stirring screw 12*b* are adjacently disposed in parallel so that their rotational axis directions coincide with the rotational axis direction of the developing sleeve 11. When the conveyance screw 12*a* and the stirring screw 12*b* are driven, the developer is circularly conveyed through the developing chamber 16*a* and the stirring chamber 16*b*. The developing sleeve 11 bears and carries the developer supplied from the developing chamber 16*a*.

A regulation blade 14 is provided at a position near the surface of the developing sleeve 11 to form a thin layer of the developer on the surface of the developing sleeve 11. The developing sleeve 11 supplies the developer to the photosensitive drum 21 at the developing position facing the photosensitive drum 21. Thus, an electrostatic latent image formed on the photosensitive drum 21 is developed.

(Configuration of Photosensitive Member Unit)

A configuration of the photosensitive member unit 20 according to the first exemplary embodiment will be described below with reference to the schematic views in FIGS. 4 and 5 and the cross-sectional view in FIG. 6.

Figure 4:
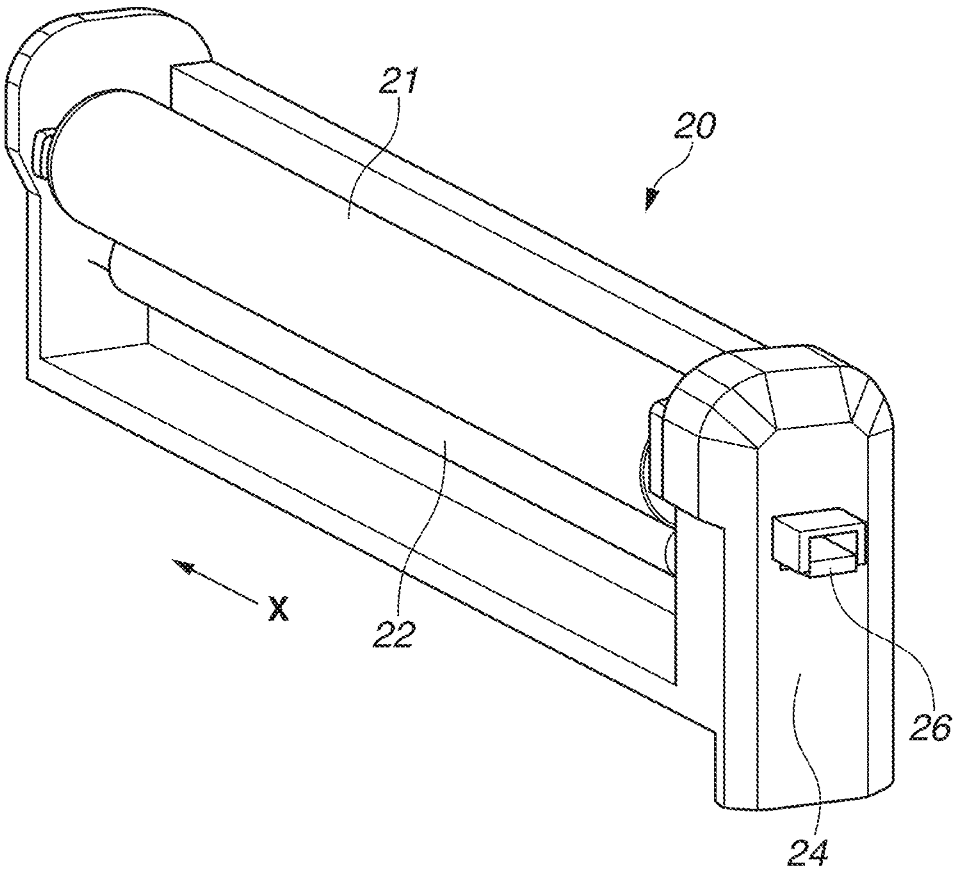
FIG. 4 is a schematic view illustrating a configuration of a photosensitive member unit according to the first exemplary embodiment.
Figure 5:
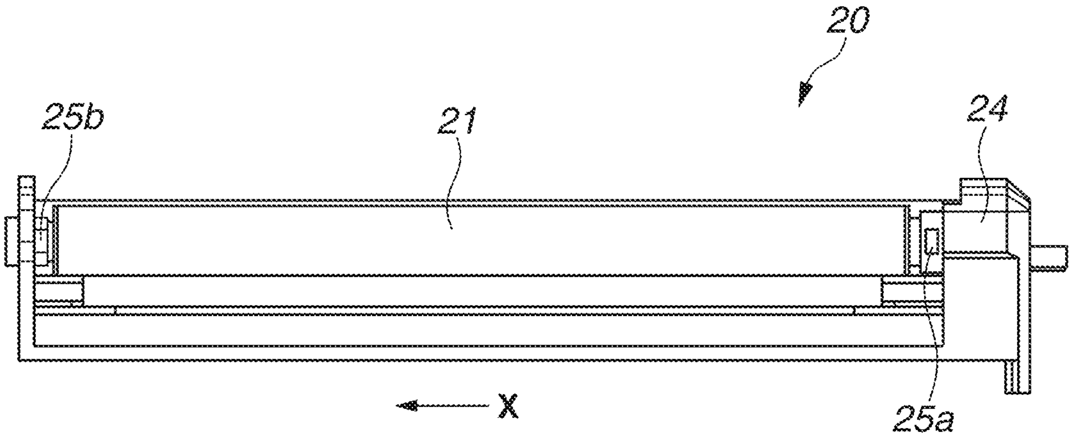
FIG. 5 is another schematic view illustrating a configuration of the photosensitive member unit according to the first exemplary embodiment.

As illustrated in FIGS. 4 and 5, the photosensitive member unit 20 includes the photosensitive drum 21 and the charge roller 22 rotatably supported by a housing 24. Bearings 25*a* and 25*b* disposed at both ends on the near and the far sides in the insertion direction (direction of the arrow X in FIGS. 4 and 5) are provided coaxially with the rotational axis of the photosensitive drum 21.

The housing 24 is disposed so that, when the photosensitive member unit 20 is attached to the apparatus body 100, the position facing the developing sleeve 11 of the developing unit 10 is opened, and a part of the photosensitive drum 21 is exposed from the opening position.

Figure 6:
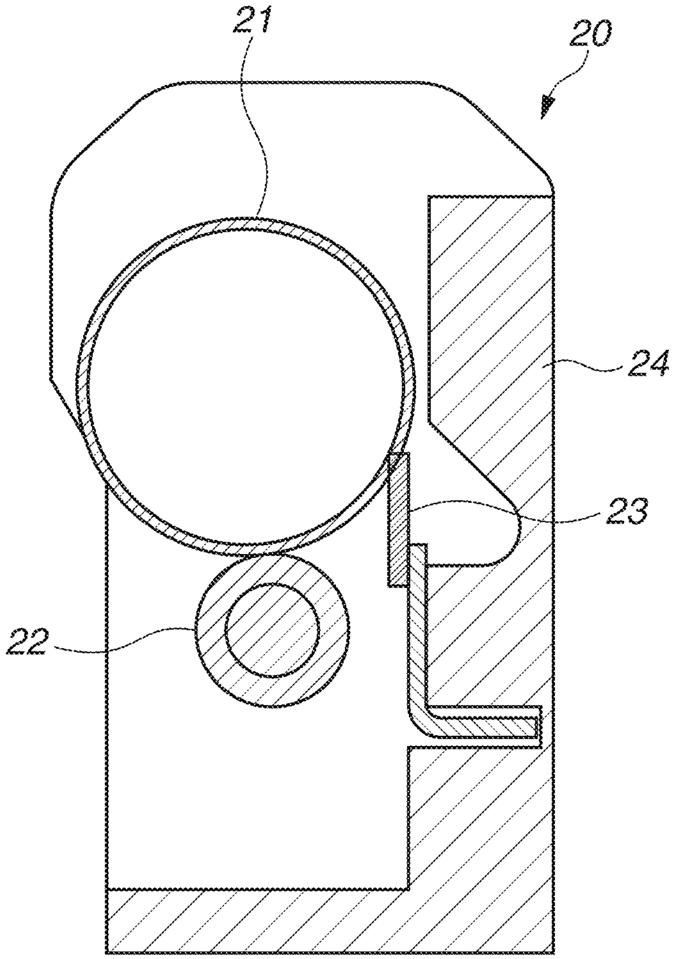
FIG. 6 is a cross-sectional view illustrating a configuration of the photosensitive member unit according to the first exemplary embodiment.

As illustrated in FIG. 6, the charge roller 22 uniformly charges the surface of the rotatably driven photosensitive drum 21. The photosensitive drum 21 is connected with a driving source (not illustrated) of the apparatus body 100 and rotated by a driving force transmitted from the driving source. Meanwhile, the charge roller 22 is pressed onto the photosensitive drum 21 and rotatably driven by the photosensitive drum 21.

After the photosensitive drum 21 is charged by the charge roller 22, an electrostatic latent image is formed on the photosensitive drum 21 by the exposure unit 60 disposed in the apparatus body 100. The electrostatic latent image formed on the photosensitive drum 21 is developed with a toner to be a visible toner image, and the toner image formed on the photosensitive drum 21 is transferred to the recording material S. Then, a drum cleaning blade 23 in contact with the photosensitive drum 21 by a predetermined pressure removes the transfer residual toner on the photosensitive drum 21.

The bearings 25*a* and 25*b* rotatably supporting the photosensitive drum 21 are brought into contact with the bearings 13*a* and 13*b*, respectively, rotatably supporting the developing sleeve 11 when the photosensitive member unit 20 is attached to the apparatus body 100. Accordingly, the bearings 25*a* and 25*b* also have a function of gap forming members for securing the gap between the photosensitive drum 21 and the developing sleeve 11 (hereinafter this gap is referred to as an SD gap).

In a state where the developing unit 10 and the photosensitive member unit 20 are attached to the apparatus body 100, the developing unit 10 is urged toward the photosensitive member unit 20. This brings the bearings 13*a* and 13*b* into contact with the bearings 25*a* and 25*b*, respectively, ensuring the positions of the developing sleeve 11 and the photosensitive drum 21.

In a state where the bearings 13*a* and 13*b* are in contact with the bearings 25*a* and 25*b*, respectively, in such a configuration, the bearings 13*a*, 13*b*, 25*a*, and 25*b* may possibly be damaged by rubbing when the photosensitive member unit 20 is inserted into or removed from the apparatus body 100 at the time of replacement of the photosensitive member unit 20. For this reason, before making the photosensitive member unit 20 attachable to and detachable from the apparatus body 100, the developing unit 10 and the photosensitive member unit 20 need to be separated to bring the bearings 13*a* and 13*b* out of contact with the bearings 25*a* and 25*b*, respectively. After bringing the bearings 13*a* and 13*b* out of contact with the bearings 25*a* and 25*b*, respectively, a sufficient gap can be ensured between the bearings 13*a* and 25*a* and between the bearings 13*b* and 25*b*. This prevents these bearings from being damaged when the photosensitive member unit 20 is inserted into or removed from the apparatus body 100.

(Configurations of Pressing Mechanism and Stopper Mechanism)

Configurations of the pressing mechanism and the stopper mechanism according to the first exemplary embodiment will be described below with reference to the schematic views in FIGS. 7A, 7B, 8A, 8B, 9A, and 9B.

Figure 7A:
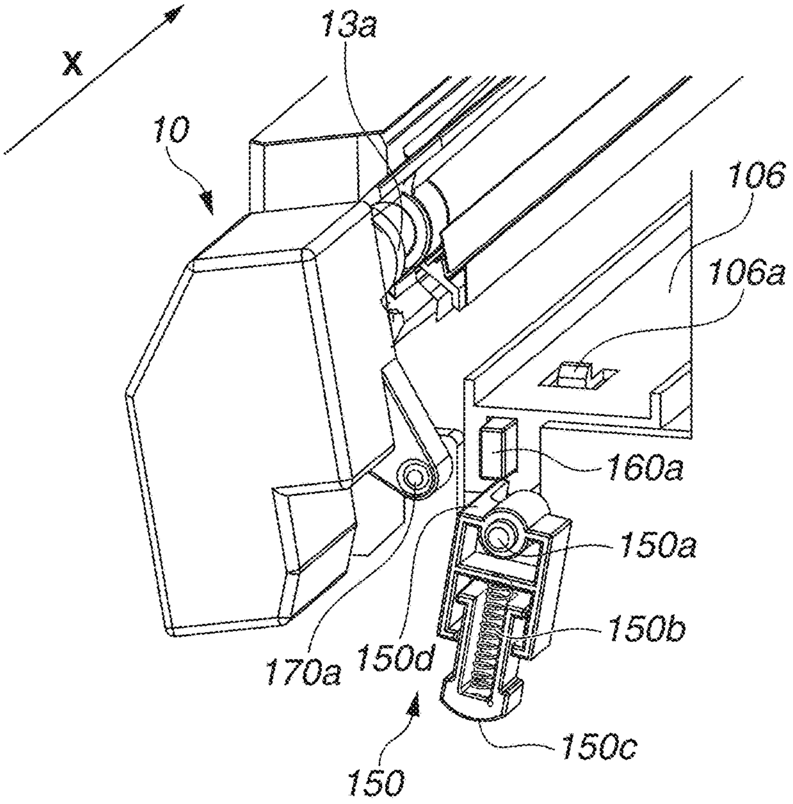
FIGS. 7A and 7B are schematic views illustrating configurations of a pressing mechanism and a stopper mechanism according to the first exemplary embodiment.
Figure 7B:
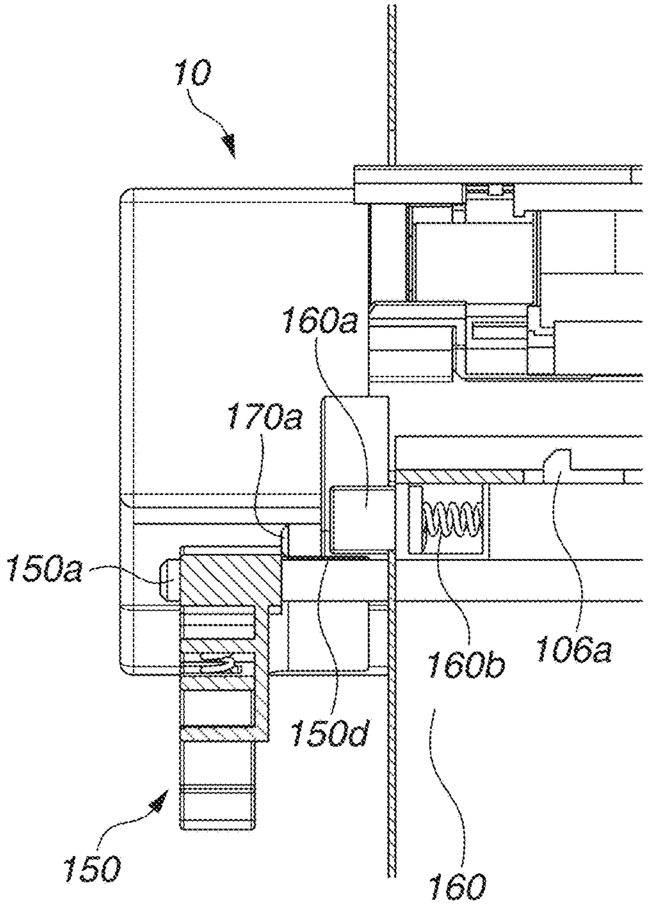

FIGS. 7A and 7B illustrate a state where the developing unit 10 is attached to the apparatus body 100 and the photosensitive member unit 20 is not attached to the apparatus body 100. As illustrated in FIGS. 7A and 7B, a handle 150 is at a position (hereinafter referred to as a second position) where application of the pressure to the developing unit 10 is released, and the developing unit 10 is separated from the developing position.

Figure 8A:
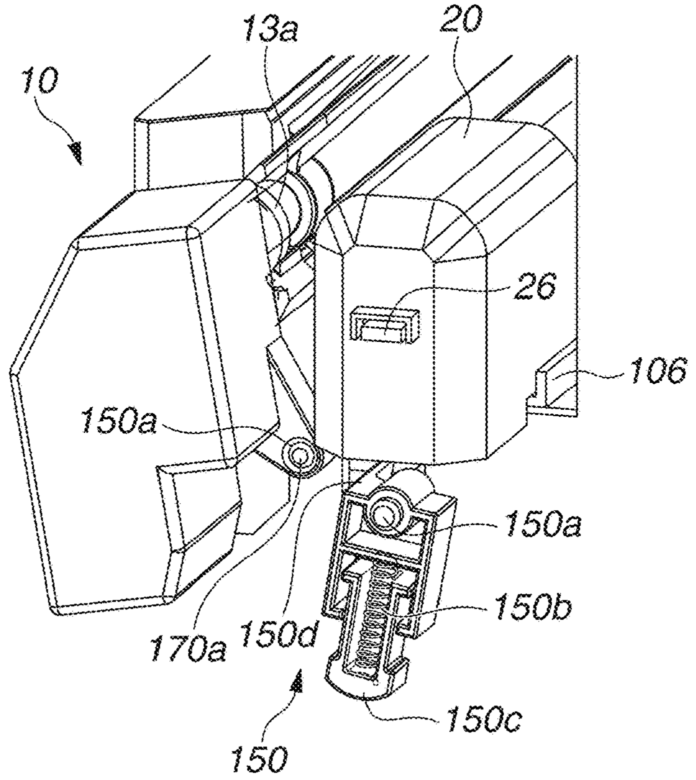
FIGS. 8A and 8B are schematic views illustrating configurations of the pressing mechanism and the stopper mechanism according to the first exemplary embodiment.
Figure 8B:
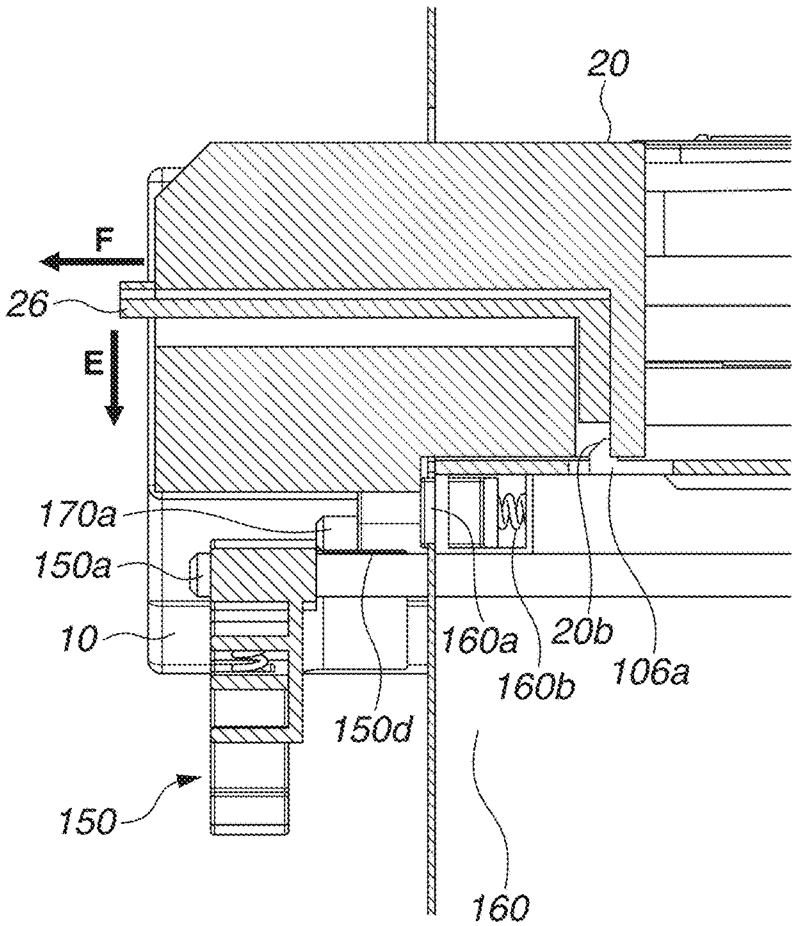

FIGS. 8A and 8B illustrate a state where the developing unit 10 is attached to the apparatus body 100, and the photosensitive member unit 20 is also attached to the apparatus body 100. As illustrated in FIGS. 8A and 8B, the handle 150 is at the second position, and the developing unit 10 is separated from the developing position.

Figure 9A:
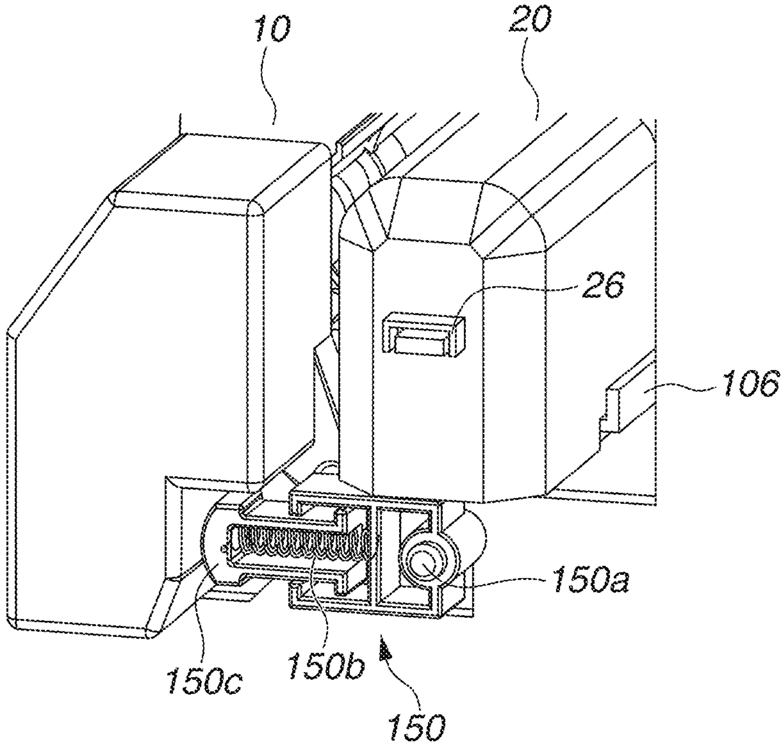
FIGS. 9A and 9B are schematic views illustrating configurations of the pressing mechanism and the stopper mechanism according to the first exemplary embodiment.
Figure 9B:
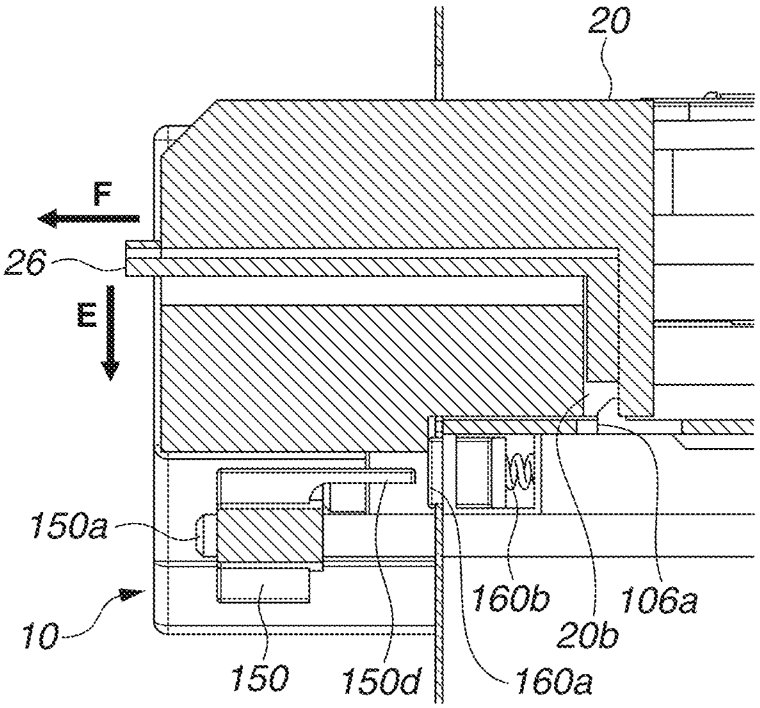

In FIGS. 9A and 9B, the photosensitive member unit 20 is attached to the apparatus body 100 and the photosensitive member unit 20 is also attached to the apparatus body 100. As illustrated in FIGS. 9A and 9B, the handle 150 is at a position (hereinafter referred to as a first position) where the developing unit 10 is pressed toward the photosensitive member unit 20.

As illustrated in FIG. 7A, the handle 150 is rotatably provided around an axis 150*a* parallel to the axis of the developing unit 10 relative to the apparatus body 100. A pressing member 150*c* urged by the pressing spring 150*b* as an urging member, and a regulation unit 150*d* for regulating the rotating action of the handle 150 are provided at the tip of the handle 150.

The developing unit 10 is provided in the apparatus body 100. A fitting hole 115*a* and a swing axis 170*a* on the near side in the insertion direction (in the direction of the arrow X in FIG. 7A) are swingably supported around a swing axis (not illustrated) fitting into a fitting hole 115*b* on the far side in the insertion direction (in the direction of the arrow X in FIG. 7A).

A drum rail 106 is provided in the apparatus body 100 to allow the photosensitive member unit 20 to be easily attached at a predetermined position in the apparatus body 100. The drum rail 106 is provided with a positioning member 106*a* protruding from the guide surface of the drum rail 106 on the near side in the insertion direction (in the direction of the arrow X in FIG. 7A).

As illustrated in FIGS. 7A and 7B, the drum rail 106 is provided with a stopper mechanism 160 for regulating the rotation of the handle 150. The stopper mechanism 160 is provided with a stopper member 160*a* and a spring 160*b* as an urging member for urging the stopper member 160*a*.

In the state illustrated in FIG. 7A, the handle 150 is at the second position, and the developing unit 10 is at a position separated from the photosensitive member unit 20 by its weight.

As illustrated in FIG. 8A, in a state where the developing unit 10 and the photosensitive member unit 20 are attached to the apparatus body 100, the developing unit 10 is not positioned relative to the photosensitive member unit 20. If a vibration is applied from outside to the apparatus body 100, for example, during transportation of the image forming apparatus 1 in a state where the developing unit 10 is not positioned as described above, the vibration may also possibly be transmitted to the developing unit 10.

Assume an example case where the user or service person closes a door (not illustrated) for accessing the photosensitive member unit 20 or the developing unit 10 in a state where the handle 150 is at the second position.

In this case, the developing unit 10 attached to the apparatus body 100 is not pressed by the handle 150 and separated from the photosensitive member unit 20 by its weight and therefore becomes unstable.

If the user or service person carelessly moves the image forming apparatus 1 in a state where the developing unit 10 is not positioned relative to the photosensitive member unit 20 in this way, the developing unit 10 vibrates, possibly colliding with a nearby unit in the apparatus body 100.

Accordingly, the door is often provided with a fool-proof shape that interferes with a part of the handle 150 if the user or service person closes the door in a state where the handle 150 is at the second position. This prevents the image forming apparatus 1 from being moved as much as possible while the developing unit 10 is not positioned relative to the photosensitive member unit 20, in an unstable orientation.

However, it may be desirable to take into consideration a case where, in a state where the photosensitive member unit 20 is not attached to the apparatus body 100 as illustrated in FIGS. 7A and 7B, the action to rotate the handle 150 from the second position to the first position is permitted, and the user or service person closes the door.

Although the developing unit 10 is pressed by the handle 150, the developing unit 10 is not positioned relative to the photosensitive member unit 20 since the photosensitive member unit 20 is not attached to the apparatus body 100. Accordingly, in a state where the photosensitive member unit 20 is not attached to the apparatus body 100, the developing unit 10 not positioned may take an unexpected orientation, possibly colliding with other units in the apparatus body 100, for example, by the vibration during transportation of the image forming apparatus 1.

According to the first exemplary embodiment, if the handle 150 is rotated in a state where the photosensitive member unit 20 is not attached to the apparatus body 100 as illustrated in FIG. 7B, the regulation unit 150*d* comes into contact with the stopper member 160*a*. This prevents the rotating action of the handle 150.

This prevents the door from being closed in a state where the photosensitive member unit 20 is not attached to the apparatus body 100 and the developing unit 10 is pressed by the handle 150. Accordingly, this also prevents the developing unit 10 not positioned from colliding with other units in the apparatus body 100, for example, by the vibration during transportation of the image forming apparatus 1.

As illustrated in FIG. 8A, the photosensitive member unit 20 is attached by being pressed toward the far side in the insertion direction (in the direction of the arrow X in FIG. 7A) of the apparatus body 100 from the insertion slot. The photosensitive member unit 20 can be slidably mounted on the drum rail 106 as a guide member having a guide surface extending in the insertion/removal direction (longitudinal direction) of the photosensitive member unit 20.

When the photosensitive member unit 20 is inserted, the positioning member 106*a* as an engagement member is elastically deformed by being pressed by the photosensitive member unit 20 and then retracted in the drum rail 106. Meanwhile, the photosensitive member unit 20 is provided with a communication hole 20*b* having an opening on the lower face.

When the photosensitive member unit 20 is inserted up to a predetermined position in the apparatus body 100, the positioning member 106*a* having been retracted in the drum rail 106 engages with the communication hole 20*b* as an engaged portion, and the photosensitive member unit 20 is attached to the apparatus body 100.

When the positioning member 106*a* engages with the communication hole 20*b*, the photosensitive member unit 20 is prevented from moving toward the near side in the insertion direction of the photosensitive member unit 20, and the photosensitive member unit 20 is fixed not to protrude from the apparatus body 100.

In the states illustrated in FIGS. 8A and 8B, the bearings 13*a* and 13*b* of the developing sleeve 11 are not in contact with the bearings 25*a* and 25*b* of the photosensitive drum 21, respectively.

On the other hand, the communication hole 20*b* having an opening on the lower face of the photosensitive member unit 20 penetrates through the photosensitive member unit 20, and is provided with the other opening on the front face of the photosensitive member unit 20 on the near side in the insertion direction. A release member 26 is provided in the communication hole 20*b*.

In a state where the photosensitive member unit 20 is attached to the apparatus body 100, one end of the release member 26 protrudes from the front face of the photosensitive member unit 20, and the other end thereof comes into contact with the positioning member 106*a* engaged with the communication hole 20*b*. When the end on the front face of the photosensitive member unit 20 is downwardly pressed (in the direction of the arrow E in FIG. 8B), the other end of the release member 26 presses down the positioning member 106*a*.

Thus, the engagement between the positioning member 106*a* and the communication hole 20*b* can be released. More specifically, attachment of the photosensitive member unit 20 to the apparatus body 100 is released, so that the photosensitive member unit 20 can be detached from the apparatus body 100.

In a state where the photosensitive member unit 20 is attached to the apparatus body 100 as illustrated in FIG. 8B, the photosensitive member unit 20 comes into contact with the stopper member 160*a* to press the stopper member 160*a* toward the spring 160*b*. Accordingly, the stopper member 160*a* is urged toward the near side in the insertion direction not only by a coupling spring of a coupling member (not illustrated) but also by the spring 160*b*. More specifically, when the photosensitive member unit 20 is attached to the apparatus body 100, the stopper member 160*a* is pressed, enabling the rotating action of the handle 150.

As illustrated in FIGS. 9A and 9B, the user or service person rotates the handle 150. When the handle 150 is rotated, the pressing member 150*c* urged by the pressing spring 150*b* presses the developing unit 10 around the swing axis 170*a* to urge and position the photosensitive member unit 20. In this case, the bearings 13*a* and 13*b* of the developing sleeve 11 are in contact with the bearings 25*a* and 25*b* of the photosensitive drum 21, respectively, and the developing unit 10 is positioned with the SD gap ensured. As a result, the door is closed in a state where the developing unit 10 is suitably positioned.

As discussed above, in the image forming apparatus 1 according to the first exemplary embodiment, the developing unit 10 is urged and positioned relative to the photosensitive member unit 20 that is positioned relative to the apparatus body 100. In a state where the photosensitive member unit 20 is not attached to the apparatus body 100 in the image forming apparatus 1, the handle 150 pressing the developing unit 10 comes into contact with the stopper member 160*a* to prevent the rotating action of the handle 150.

This prevents the door from being closed in a state where the photosensitive member unit 20 is not attached to the apparatus body 100 and the developing unit 10 is pressed by the handle 150. For this reason, the developing unit 10 not positioned can be prevented from colliding with other units in the apparatus body 100, for example, by the vibration during transportation of the image forming apparatus 1.

This means that, in the configuration of the first exemplary embodiment, the photosensitive member unit 20 is positioned relative to the apparatus body 100, and the developing unit 10 is positioned relative to the photosensitive member unit 20. In this configuration according to the first exemplary embodiment, the stopper mechanism 160 urges the stopper member 160*a* so that the stopper member 160*a* is at the retracting position in a state where the photosensitive member unit 20 is attached to the apparatus body 100 and the developing unit 10 is also attached to the apparatus body 100. In this configuration according to the first exemplary embodiment, the stopper mechanism 160 urges the stopper member 160*a* so that the stopper member 160*a* is at the retracting position in a state where the photosensitive member unit 20 is attached to the apparatus body 100 and the developing unit 10 is not attached to the apparatus body 100. In this configuration according to the first exemplary embodiment, the stopper mechanism 160 urges the stopper member 160*a* so that the stopper member 160*a* is at the regulating position in a state where the photosensitive member unit 20 is not attached to the apparatus body 100 and the developing unit 10 is attached to the apparatus body 100.

According to the first exemplary embodiment, in a configuration in which the photosensitive member unit 20 serves as a reference for positioning the developing unit 10, the orientation of the developing unit 10 can be ensured in a case where the developing unit 10 is attached to the apparatus body 100 and the photosensitive member unit 20 is not attached to the apparatus body 100.

According to a second exemplary embodiment, a door is provided on each of the image forming units UY to UK to cover the insertion slot for each color. The developing unit 10 is separated from the photosensitive member unit 20 in association with the opening action of each door. A configuration in which the developing unit 10 is pressed onto the photosensitive member unit 20 in association with the closing action of the door will be described below.

The second exemplary embodiment will be described below on the premise that the developing unit 10 is configured to be attachable to and detachable from the apparatus body 100. The attachment and detachment of the photosensitive member unit 20 to/from the apparatus body 100 according to the second exemplary embodiment are similar to the attachment and detachment according to the first exemplary embodiment, and detailed descriptions thereof will be omitted.

Figure 10:
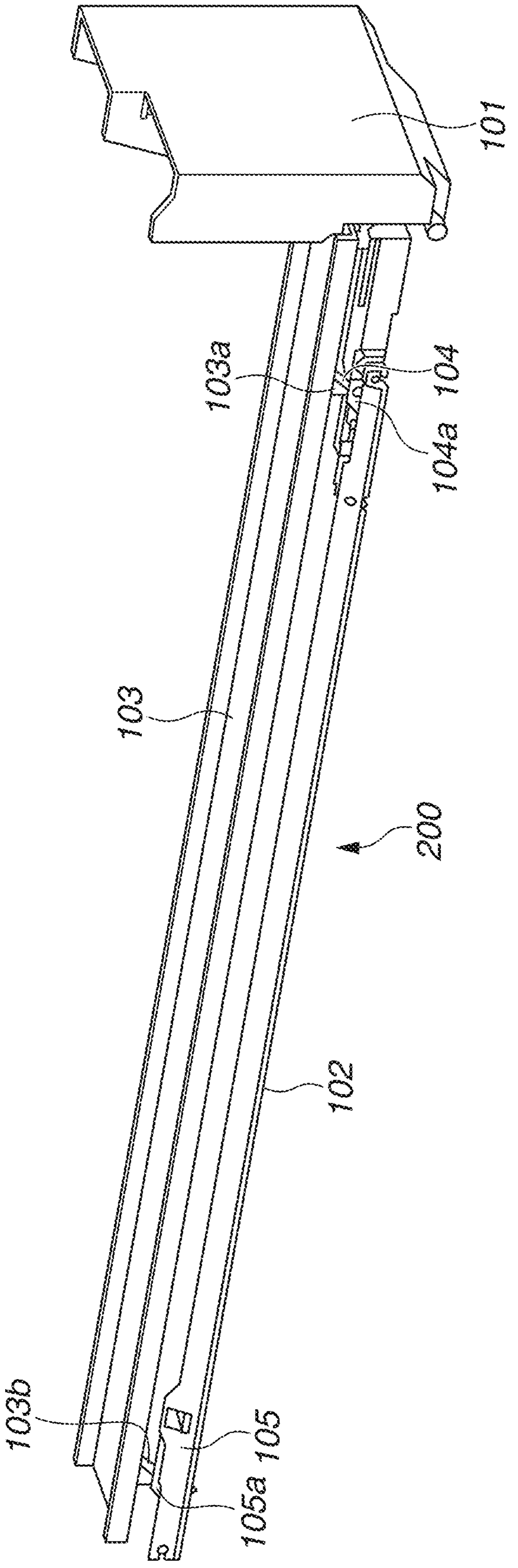
FIG. 10 is an external view illustrating configurations of a pressing mechanism and a door according to a second exemplary embodiment.

FIG. 10 is an outside drawing illustrating configurations of the pressing mechanism and the door according to the second exemplary embodiment.

Figure 11:
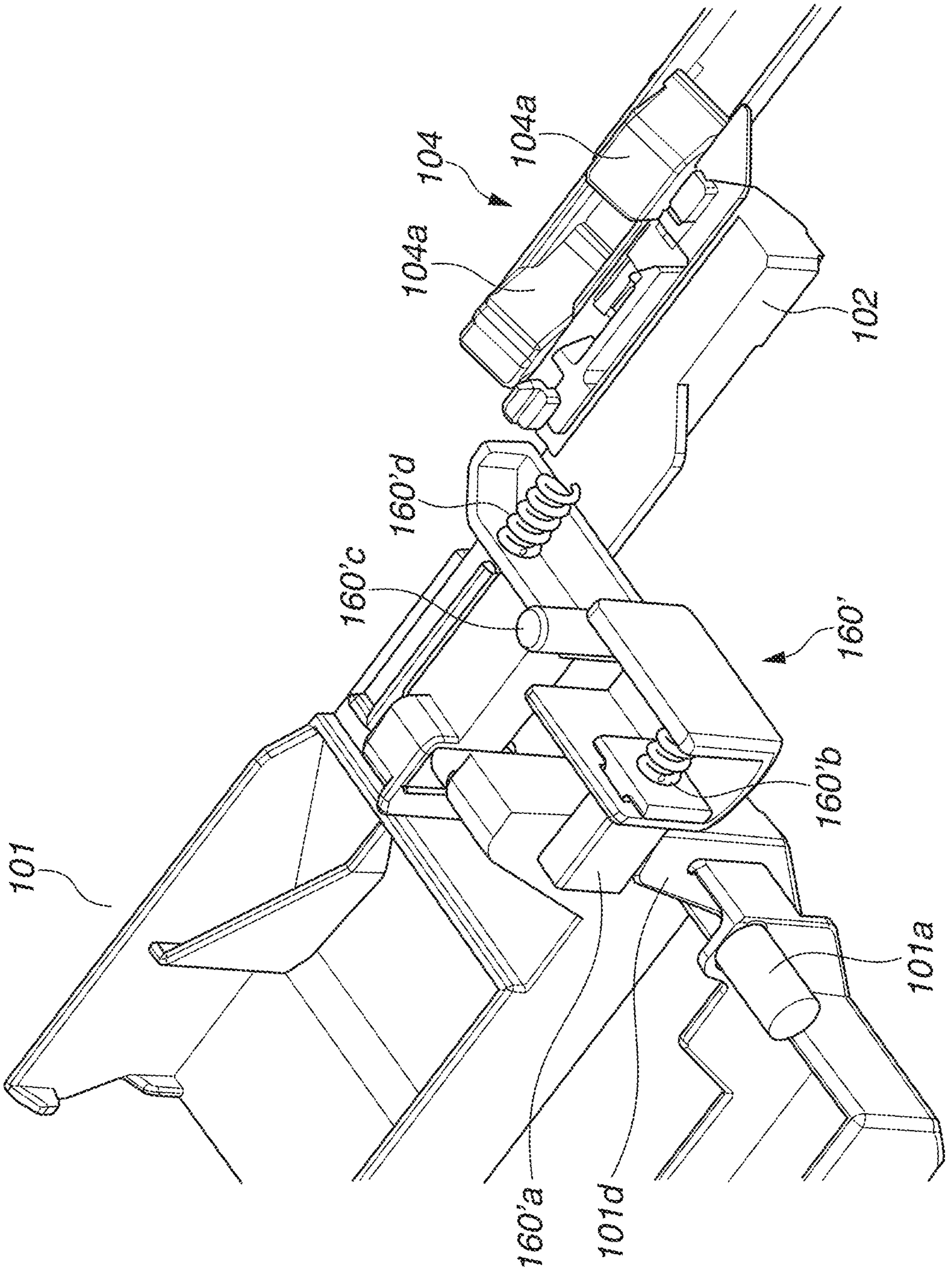
FIG. 11 is a schematic view illustrating a configuration of a stopper mechanism according to the second exemplary embodiment.

FIG. 11 is schematic view illustrating a configuration of the stopper mechanism 160 according to the second exemplary embodiment. More specifically, FIG. 11 illustrates a joint between the door and the pressing mechanism, and a configuration of the stopper mechanism 160 for regulating the door opening/closing action.

Figure 12A:
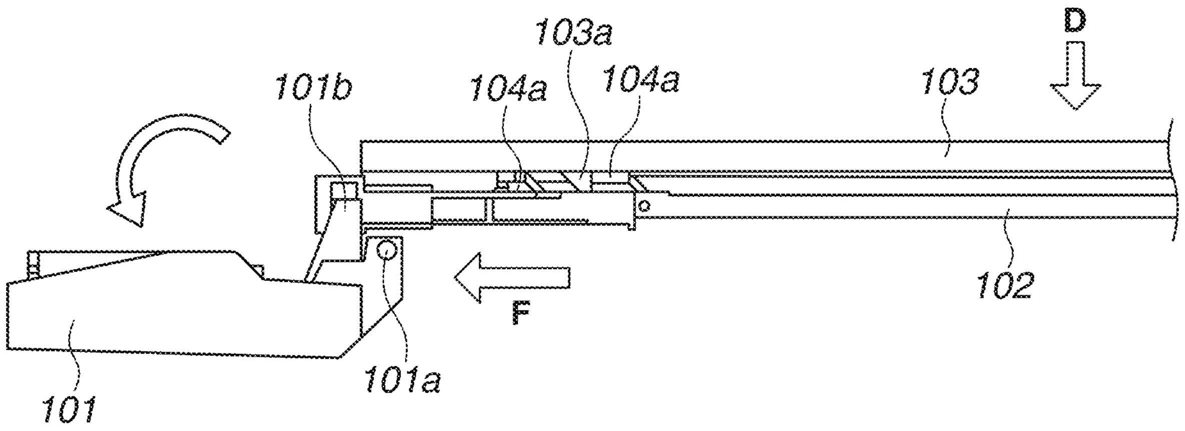
FIGS. 12A and 12B are schematic views illustrating configurations of the pressing mechanism and the door according to the second exemplary embodiment.
Figure 12B:
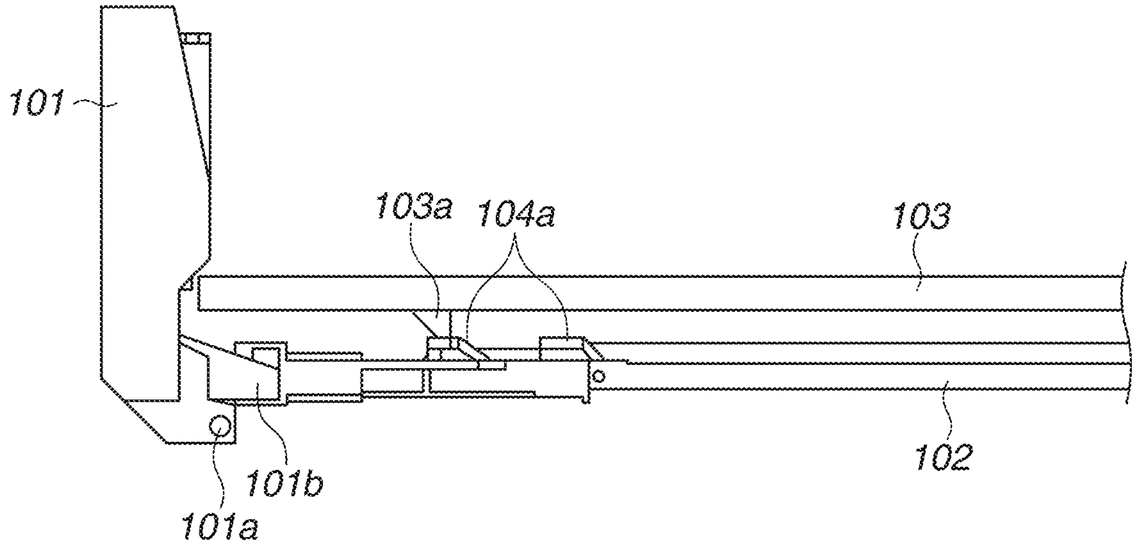

FIGS. 12A and 12B are schematic views illustrating configurations of the pressing mechanism and the door according to the second exemplary embodiment. More specifically, FIGS. 12A and 12B illustrate the door opening/closing action and the state of the pressing mechanism.

Figure 13:
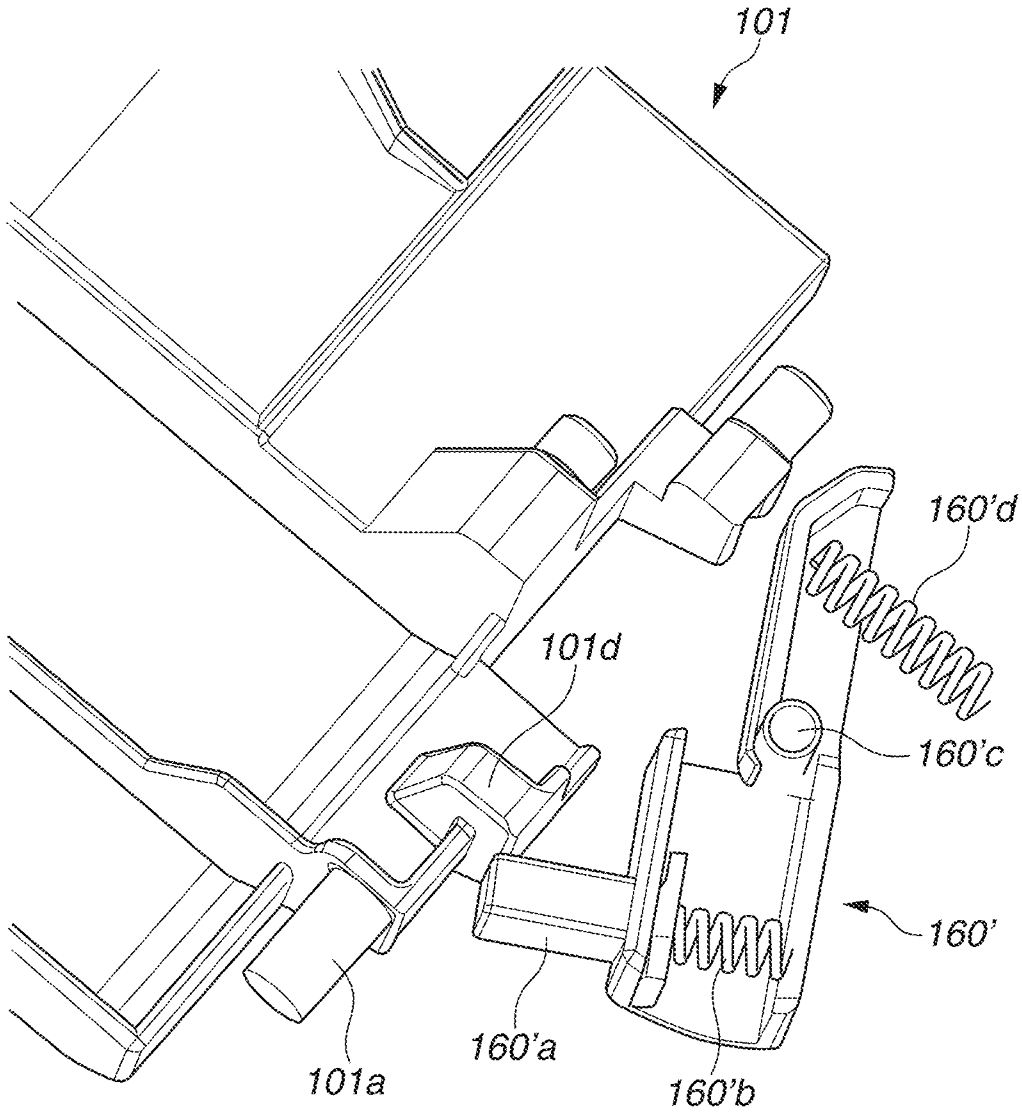
FIG. 13 is a schematic view illustrating a configuration of the stopper mechanism according to the second exemplary embodiment.

FIG. 13 is a schematic view illustrating a configuration of the stopper mechanism 160 according to the second exemplary embodiment. More specifically, FIG. 13 illustrates a state of the stopper mechanism 160 based on a combination of a state where the developing unit 10 and the photosensitive member unit 20 are attached to the apparatus body 100 and a state where neither unit is attached to the apparatus body 100.

As illustrated in FIG. 10, the pressing mechanism 200 includes a separation link 102 and a developing rail 103. The developing unit 10 can be slidably mounted on the developing rail 103 including a guide surface extending in the insertion direction (longitudinal direction). When the developing unit 10 is slid on the developing rail 103, the developing unit 10 is guided into the apparatus body 100.

Under the developing rail 103, there is disposed the separation link 102 extending in the insertion direction (longitudinal direction) along the developing rail 103. The separation link 102 is provided with pressure levers 104 and 105 at both ends in the insertion direction, i.e., the pressure lever 104 on the far side in the insertion direction (downstream side in the insertion direction) and the pressure lever 105 on the near side in the insertion direction (upstream side in the insertion direction upstream).

As illustrated in FIG. 11, the pressure levers 104 and 105 include fitting members 104*a* and 105*a*, respectively, formed so that the amount of upward protrusion in the vertical direction increases toward a door 101 from the far side of the apparatus body 100.

As illustrated in FIG. 10, the developing rail 103 includes fit members 103*a* and 103*b* that can be engaged with the fitting members 104*a* and 105*a* of the pressure levers 104 and 105, respectively.

The door 101 is fastened to the separation link 102 via a link member 101*b*.

The second exemplary embodiment includes a stopper mechanism 160' having a stopper member 160'*a* for regulating the closing action of the door 101, and a first urging spring 160'*b* as an urging member for urging the stopper member 160'*a*. The second exemplary embodiment includes a rotary axis 160'*c* for rotatably supporting the stopper mechanism 160' relative to the apparatus body 100, and a second urging spring 160'*d* as an urging member for urging the stopper mechanism 160' around the rotary axis 160'*c*.

The action of the pressing mechanism for pressing the developing unit 10 in association with the opening/closing action of the door 101 will be described below with reference to FIGS. 12A and 12B.

The door 101 is disposed at an insertion slot (not illustrated) of the apparatus body 100 so that the door 101 can rotate around a rotary axis 101*a*, between a closing position where the door 101 covers the upstream end of the developing unit 10 in the insertion direction and an opening position where the door 101 exposes the upstream end of the developing unit 10 in the insertion direction.

The separation link 102 moves toward the near side in the insertion direction (second position) when the door 101 is opened, and moves toward the far side in the insertion direction (first position) when the door 101 is closed.

In a state where the door 101 is open (open state) illustrated in FIG. 12A, the fitting members 104*a* and 105*a* fit into the fit members 103*a* and 103*b*, respectively.

When the fitting members 104*a* and 105*a* fit into the fit members 103*a* and 103*b*, respectively, the developing rail 103 is downwardly moved in the vertical direction (toward the installation surface of the image forming apparatus 1) in FIG. 12A to come closer to the separation link 102 than in a state where fitting members 104*a* and 105*a* do not fit into the fit members 103*a* and 103*b*.

More specifically, when the door 101 is opened from the closed state, the link member 101*b* moves toward the near side in the insertion direction (see the arrow F in FIG. 12A). Accordingly, the separation link 102 also moves to the second position on the near side in the insertion direction. When the separation link 102 moves to the second position, the fit members 103*a* and 103*b* slide down along the fitting members 104*a* and 105*a*, and then the fitting members 104*a* and 105*a* fit into the fit members 103*a* and 103*b*, respectively.

Thus, the developing rail 103 moves downwardly in the vertical direction (the direction of the arrow D in FIG. 12A), and the developing unit 10 and the photosensitive member unit 20 separate from each other. In this case, the bearings 13*a* and 13*b* of the developing sleeve 11 are not in contact with the bearings 25*a* and 25*b* of the photosensitive drum 21, respectively.

On the other hand, in a state where the door 101 is closed (closed state) illustrated in FIG. 12B, the fitting member 104*a* (the fitting member 105*a* omitted from FIG. 12A) does not fit into the fit member 103*a* (the fit member 103*b* omitted from FIG. 12A). When the fitting members 104*a* and 105*a* do not fit into the fit members 103*a* and 103*b*, respectively, the developing rail 103 is upwardly moved in the vertical direction (toward the side opposite to the installation surface side of the image forming apparatus 1) so that the developing rail 103 is separated from the separation link 102.

More specifically, when the door 101 is opened, the link member 101*b* moves toward the far side in the insertion direction, and the separation link 102 also similarly moves to the first position on the far side in the insertion direction. In a state where the developing unit 10 and the photosensitive member unit 20 are attached to the apparatus body 100, the developing unit 10 is pressed onto the photosensitive member unit 20. In this case, the bearings 13*a* and 13*b* of the developing sleeve 11 come into contact with the bearings 25*a* and 25*b* of the photosensitive drum 21, respectively, and the developing unit 10 is positioned with the SD gap ensured.

Thus, as the developing rail 103 is vertically moved in association with the opening/closing action of the door 101, the developing unit 10 is pressed onto and separated from the photosensitive member unit 20.

A state where the developing unit 10 is attached to the apparatus body 100 and the photosensitive member unit 20 is not attached to the apparatus body 100 will be considered below. In this case, a case where the user or service person closes the door 101 needs to be considered.

In association with the closing action of the door 101, the separation link 102 moves to the first position, and the developing unit 10 is pressed. However, since the photosensitive member unit 20 is not attached to the apparatus body 100, the developing unit 10 is not positioned and may possibly become unstable.

If the user or service person carelessly moves the image forming apparatus 1 in a state where the developing unit 10 is not positioned relative to the photosensitive member unit 20 in this way, the developing unit 10 vibrates, possibly colliding with a nearby unit in the apparatus body 100.

According to the second exemplary embodiment, in a state where the photosensitive member unit 20, relative to which the developing unit 10 is positioned and urged, is not attached to the apparatus body 100 as illustrated in FIG. 11, a regulation member 101*d* of the door 101 comes into contact with the stopper member 160' to regulate the closing action of the door 101.

This prevents the door 101 from being closed in a state where the photosensitive member unit 20, relative to which the developing unit 10 is positioned, is not attached to the apparatus body 100 and the developing unit 10 is pressed. This prevents the image forming apparatus 1 from being moved as much as possible in a state where the developing unit 10 not positioned relative to the photosensitive member unit 20 is in an unstable orientation.

In a state where the photosensitive member unit 20 is attached to the apparatus body 100, the stopper member 160'*a* is pressed against the spring 160'*b*, like in the first exemplary embodiment. More specifically, when the photosensitive member unit 20 is attached to the apparatus body 100, the photosensitive member unit 20 presses the stopper member 160'*a*, allowing the closing action of the door 101.

More specifically, the user or service person closes the door 101 in a state where the developing unit 10 and the photosensitive member unit 20 are attached to the apparatus body 100. As a result, as illustrated in FIG. 12B, the separation link 102 moves to the first position, and the developing unit 10 is pressed against the photosensitive member unit 20.

In this case, the bearings 13*a* and 13*b* of the developing sleeve 11 come into contact with the bearings 25*a* and 25*b* of the photosensitive drum 21, respectively, and the developing unit 10 is positioned with the SD gap ensured. As a result, the door 101 is closed in a state where the developing unit 10 is suitably positioned, making it possible to prevent the developing unit 10 from colliding with a nearby unit.

A state where the developing unit 10 is attachable to and detachable from the apparatus body 100, and neither the developing unit 10 nor the photosensitive member unit 20 is attached to the apparatus body 100 will be described below.

The stopper mechanism 160' according to the second exemplary embodiment is rotatable around the rotary axis 160'*c*. Accordingly, in a state where the developing unit 10 is not attached to the apparatus body 100, the stopper mechanism 160' is rotated by the second urging spring 160'*d* as illustrated FIG. 13. As a result, the regulation member 101*d* of the door 101 and the stopper member 160'*a* do not come into contact with each other, and the action to close the door 101 is not regulated.

According to the above-described first exemplary embodiment, the stopper member 160*a* is urged so that the stopper member 160*a* is at the regulating position in a state where neither the photosensitive member unit 20 nor the developing unit 10 is attached to the apparatus body 100. The regulating position refers to a position where the pressing member (the handle 150 according to the first exemplary embodiment) pressing the developing unit 10 is prevented from moving from the second position for releasing application of the pressure to the developing unit 10 to the first position for pressing the developing unit 10 toward the photosensitive member unit 20.

According to the second exemplary embodiment, on the other hand, the stopper member 160'*a* is urged so that the stopper member 160'*a* moves from the regulating position to the retracting position in a state where neither the photosensitive member unit 20 nor the developing unit 10 is attached to the apparatus body 100. The retracting position refers to a position where the pressing member (the pressure lever 104 according to the second exemplary embodiment) pressing the developing unit 10 is permitted to move from the second position for releasing application of the pressure to the developing unit 10 to the first position for pressing the developing unit 10 toward the photosensitive member unit 20.

For this reason, according to the second exemplary embodiment, the user or service person can close the door 101 even in a state where neither the photosensitive member unit 20 nor the developing unit 10 is attached to the apparatus body 100. In a state where neither the developing unit 10 nor the photosensitive member unit 20 is attached to the apparatus body 100, units do not collide with each other even if the image forming apparatus 1 is moved.

On the other hand, in a state where the developing unit 10 is attached to the apparatus body 100, the stopper mechanism 160' is pressed onto the developing unit 10 and rotates around the rotary axis 160'*c* up to the position illustrated in FIG. 11. The effect of the subsequent action of the stopper mechanism 160' is as described above with reference to the first exemplary embodiment.

The second exemplary embodiment has been described above centering on a configuration in which the separation link 102 moves in association with the opening/closing action of the door 101. However, the present exemplary embodiment is not limited to the example. Like the above-described first exemplary embodiment, when the door 101 is rotated by the opening/closing action of the door 101, the pressing mechanism may move as the door 101 rotates.

The present disclosure is not limited to the above-described exemplary embodiments and can be modified in diverse ways (including organic combinations of these exemplary embodiments) based on the spirit and scope thereof. These modifications are not excluded from the scope of the present disclosure.

According to the above-described exemplary embodiments, the photosensitive member unit 20 is insertable into and removable from the apparatus body 100, and the developing unit 10 is brought into and out of contact with the photosensitive member unit 20. However, the present exemplary embodiment is not limited to the examples. For example, the developing unit 10 may be insertable into and removable from the apparatus body 100, and the photosensitive member unit 20 may be brought into and out of contact with the developing unit 10.

According to the above-described exemplary embodiments, the image forming apparatus 1 primarily transfers the toner image carried by the photosensitive drum 21 onto the intermediate transfer belt 30, as illustrated in FIG. 1. Then, the image forming apparatus 1 brings the recording material S into contact with the intermediate transfer belt 30, and secondarily transfers the toner image carried by the intermediate transfer belt 30 to the recording material S. Although the exemplary embodiments have been described above centering on the image forming apparatus 1 having such a configuration, the present disclosure is not limited to the examples. The present disclosure is also applicable to an image forming apparatus configured to directly bring the recording material S into contact with the photosensitive drum 21 and directly transfer the toner image carried by the photosensitive drum 21 to the recording material S.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-025974, filed Feb. 22, 2024, which is hereby incorporated by reference herein in its entirety.

What is claimed is:

1. An image forming apparatus comprising:

an apparatus body;

a photosensitive member unit including a photosensitive member on which an electrostatic latent image is formed, and configured to be attachable to and detachable from the apparatus body and positioned relative to the apparatus body;

a developing unit including a developer carrier for bearing and carrying a developer for developing the electrostatic latent image formed on the photosensitive member, and configured to be attachable to and detachable from the apparatus body and positioned relative to the photosensitive member unit attached to the apparatus body;

a pressing member configured to be movable between a first position for pressing the developing unit toward the photosensitive member unit and a second position for releasing application of pressure to the developing unit;

a stopper member configured to be movable between a regulating position for preventing the pressing member from moving from the second position to the first position and a retracting position for permitting the pressing member to move from the second position to the first position, the retracting position being retracted from the regulating position; and an urging member configured to urge the stopper member, wherein, in a case where the developing unit is attached to the apparatus body and the photosensitive member unit is also attached to the apparatus body, the stopper member urged by the urging member is at the retracting position, and wherein, in a case where the developing unit is attached to the apparatus body and the photosensitive member unit is not attached to the apparatus body, the stopper member urged by the urging member is at the regulating position.

2. The image forming apparatus according to claim 1, wherein, in a case where the developing unit is not attached to the apparatus body and the photosensitive member unit is attached to the apparatus body, the stopper member urged by the urging member is at the retracting position.

3. The image forming apparatus according to claim 1, wherein, in a case where the developing unit is not attached to the apparatus body and the photosensitive member unit is not attached to the apparatus body, the stopper member urged by the urging member is at the regulating position.

4. The image forming apparatus according to claim 1, wherein, in a case where the developing unit is not attached to the apparatus body and the photosensitive member unit is not attached to the apparatus body, the stopper member urged by the urging member is at the retracting position.

5. The image forming apparatus according to claim 1, further comprising a door disposed to be rotatable relative to the apparatus body, and configured to be movable between a closing position for covering the developing unit attached to the apparatus body and an opening position for exposing the developing unit attached to the apparatus body, wherein the pressing member moves from the second position to the first position as the door moves from the opening position to the closing position by the rotation of the door, and wherein the pressing member moves from the first position to the second position as the door moves from the closing position to the opening position by the rotation of the door.

* * * * *